United States Patent

[11] 3,593,160

[72] Inventor John Richard Moore
Weston, near Crewe, England
[21] Appl. No. 777,843
[22] Filed Nov. 21, 1968
[45] Patented July 13, 1971
[73] Assignee International Computers Limited
London, England
[32] Priority Nov. 21, 1967
[33] England
[31] 53020/67

[54] CLOCK-SYNCHRONIZING CIRCUITS
6 Claims, 4 Drawing Figs.

[52] U.S. Cl. .......... 328/63, 178/69.5, 179/15, 328/72, 328/133, 328/155
[51] Int. Cl. .......... H04l 7/00
[50] Field of Search .......... 328/72, 63, 127, 133, 155; 178/69.5, 53, 53.1; 179/15

[56] References Cited

UNITED STATES PATENTS

| | | | |
|---|---|---|---|
| 2,934,604 | 4/1960 | Bizet .......... | 178/69.5 X |
| 3,112,363 | 11/1963 | Schramel et al. .......... | 178/69.5 X |
| 3,440,547 | 4/1969 | Houcke .......... | 328/63 |
| 3,472,956 | 10/1969 | Glasson .......... | 178/69.5 |
| 3,488,440 | 1/1970 | Logan et al. .......... | 178/69.5 |

*Primary Examiner*—John S. Heyman
*Assistant Examiner*—R. C. Woodbridge
*Attorney*—Hane & Baxley

ABSTRACT: A system for the generation of clock signals in a data processing apparatus is disclosed, in which the clock signals are developed from a source of higher frequency pulses. The clock signals are applied to an apparatus in which data signals are represented in nonreturn-to-zero (NRZ) manner, and the clock signals are synchronized to the occurrence of changes in data item representation. It is recognized that the synchronization of the signals may vary and, in particular that there is a condition of spurious synchronization in which the clock signals may occur 180° out of phase with data changes. The system proposed is arranged to recognize both variations in synchronism and the spurious synchronism condition and to correct the relative timing between clock and data change signals to bring the system into true synchronism by modifying the application of the higher frequency pulses to a clock signal generating countdown arrangement.

INVENTOR
JOHN RICHARD MOORE
BY Haseltine and Bailey
ATTORNEYS

INVENTOR
JOHN RICHARD MOORE
BY Hane and Baxley
ATTORNEYS

INVENTOR
JOHN RICHARD MOORE
BY Hane and Baxley
ATTORNEYS

CLOCK-SYNCHRONIZING CIRCUITS

BACKGROUND OF THE INVENTION

1. Field of the Invention

The present invention relates to clock-synchronizing systems for synchronizing clock pulses to the occurrence of data-representing signals in a data processing apparatus, and particularly to clock pulse synchronizing systems for use in conjunction with NRZ data representations.

2. Description of the Prior Art

It has previously been proposed to generate a stream of substantially regularly occurring clock pulses for use in data processing apparatus by applying a stream of higher frequency pulses to a binary countdown circuit, the output of the countdown circuit then forming the clock pulse train. Such a mode of generating clock pulses has been used in conjunction with data processing apparatus in which items of data have been recorded on a magnetic recording medium, such as magnetic tape. One of the difficulties in dealing with information derived from reading a magnetic recording tape is that any variation in speed of the tape results in a corresponding variation in the frequency with which items recorded at a substantially constant spacing on the tape are available for further processing.

Items are frequently recorded in the so-called NRZ mode. In this mode a succession of data items have either of two binary coded values, namely 0 or 1. The recording medium is set to one of two corresponding states, according to the value of a data item to be recorded, but the individual items are not separately distinguished, the medium changing from one state to the other only if the recorded value changes. Hence, in recording or reading items of data in this mode, a train of clock pulses of substantially constant frequency is used, each interclock pulse period corresponding to the time available for the recording of a single data item. Thus, a succession of like items having the same value will result in a substantially constant setting of the medium (or of a substantially constant output signal during a reading operation) for the duration of the number of clock pulse periods corresponding to the number of like items. Hence, in reading items from the tape it is necessary to generate a train of clock pulses of the requisite frequency, and it is possible to detect any lack of synchronism between the clock pulses and the data item signal only at changes of significance or value of the recorded items.

The synchronism of the clock pulse train with respect to the data item signal may vary, for example, because the signal itself may be distorted in the reading process, one common form of distortion being known as bias distortion. Moreover, the use of the NRZ technique in data transmission systems, in which the recording medium is at a remote station means that it is not in general possible to predetermine the phase synchronization of the clock pulses with the generation of the data item signal. Hence it is possible for a spurious synchronization of the clock and data signals to occur in which the clock pulse train is 180° out of phase with the data signal. In such systems, too, the clock pulse synchronizing arrangement must have a high degree of immunity to impulse noise generated in the transmission system.

The present invention provides an improved clock pulse synchronizing system in which not only is the synchronism checked at changes in the data item signal but also the presence of the spurious synchronism condition is detected, and the relative timing between the clock pulses and the data item signal changes are modified to maintain proper synchronism.

SUMMARY

According to the present invention a clock-synchronizing system includes a source of pulses at a substantially constant repetition frequency, means for applying selected ones of said pulses to a countdown circuit to produce timing signals normally occurring at predetermined time intervals, an error-detecting circuit responsive to said timing signals and to a data signal having significant transitions each representing a change in data significance to generate a further pulse if two successive transitions occur during one of said timing intervals, and means for applying said further pulse to said countdown circuit to shorten a following one of said predetermined time intervals.

BRIEF DESCRIPTION OF THE PREFERRED EMBODIMENT

Figure 2:
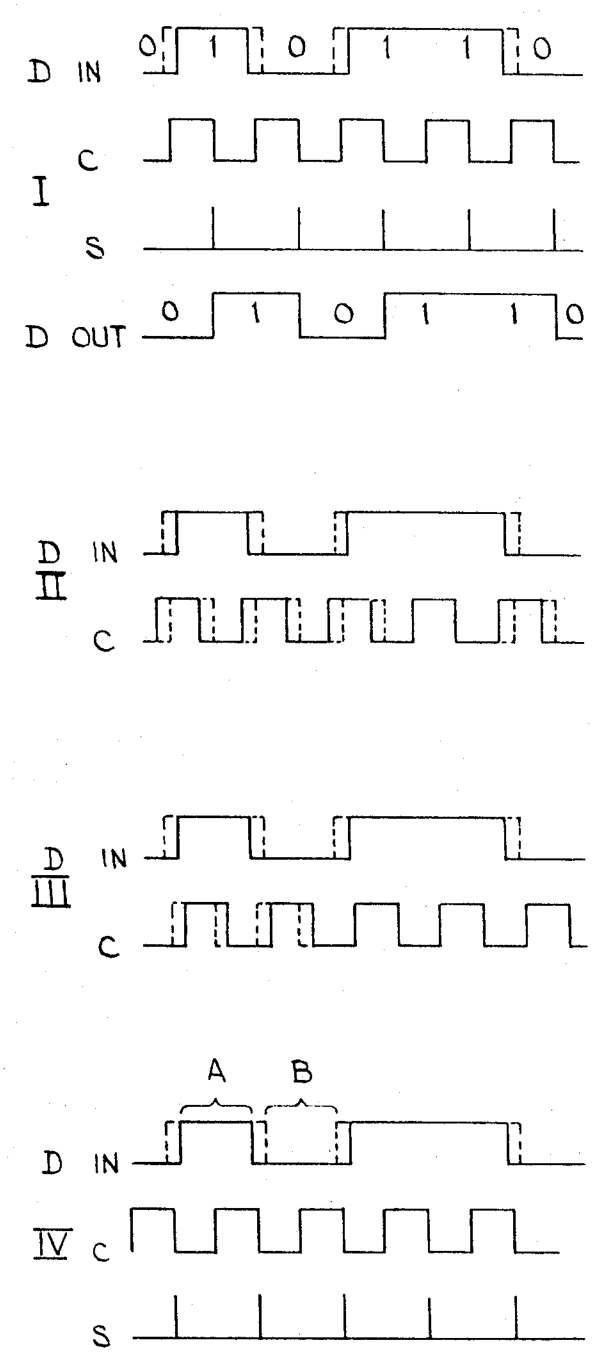
FIG. 2 comprises groups I to IV of waveforms illustrating different conditions of synchronization of clock pulses with a data signal.

Referring now to FIG. 2, it will be helpful, before considering the details of the synchronizing system, first to consider the operating conditions required to be fulfilled by such a system. FIG. 2I shows the desired relationships between data and clock waveforms. A clock pulse waveform C consists of a substantially symmetrical square waveform including positive-going clock pulses separated by interclock pulse periods, the clock pulses and interclock pulse periods being of substantially equal duration. A complete clock pulse cycle consists of a single pulse followed by one interpulse period, and it will thus be seen that the negative-going edge of the clock pulse occurs midway through the cycle. A strobing waveform S is conveniently derived from this negative-going edge of the clock pulses, and it will be seen that individual strobing signals in this waveform thus occur midway through the cycle.

A data-representing waveform D IN has two states representative respectively of binary code components 0 and 1. As shown, the waveform D IN has a lower level representing the component 0 and a higher level representing the component 1. The waveform remains at a steady level for as long as successive data items require the binary code component to remain unchanged, a single data item nominally being represented throughout a complete clock pulse cycle. Thus, the identification of individual data items in a succession is achievable by ascertaining the level of the data waveform D IN at the midpoints of successive clock pulse cycles. It is to be realized, however, that the waveform D IN for an incoming signal may be distorted slightly due, for example, to bias distortion, with the result that the actual duration of the levels of the waveform may vary slightly from nominal. In the example shown in FIG. 2I, variations from the nominal durations are shown, a full line indicating the effect of bias distortion in one sense, while a broken line indicates the effect of bias distortion in an opposite sense. While such variations in duration are of no consequence provided that the midpoint of the clock pulse cycle is the point at which the level is interrogated, it is desirable that, after synchronization, the data waveform shall be restored to a true nominal timing, and the strobing signals of the waveform S are used to interrogate the incoming data waveform D IN and to produce a retimed and accurately synchronized output data waveform D OUT, as indicated in FIG. 2I. For clarity the binary code significance of individual data items in a succession are indicated in association with waveforms D IN and D OUT.

Due to the possible departure from nominal frequency of clock pulses resulting in the midpoint of the clock pulse cycle drifting relative to the center points of data item representations in the incoming data waveform D IN, or to a discrepancy between the timings of an initially applied data-representing waveform and the clock pulse waveform C, for example, it may happen that at some time during the application of a data-representing waveform the clock pulse cycle may become advanced or retarded relative to its nominal position.

For example in FIG. 2II the condition is illustrated in which the clock pulse cycle is advanced. Thus, it will be seen that the clock pulse waveform C indicated by a full line occurs earlier than it ought with respect to the incoming data-representing waveform D IN. For ease of comparison with FIG. 2I, the nominal timing of the clock pulse waveform C is indicated by a broken line.

The opposite condition is indicated in FIG. 2III, in which the clock pulse waveform C is retarded with respect to the data-representing waveform D IN. Again, for ease of comparison the nominal timing of the clock pulse waveform C is indicated by a broken line.

Examination of the sets of waveforms C and D IN in FIGS. 2I, II, and III shows that in FIG. 2I, in which the waveforms are correctly timed with respect to each other, clock pulse waveform C is alternately at high and low levels in the occurrence of successive changes in level of the data-representing waveform D IN, and this is true whether the bias distortion imposed on the data-representing waveform D IN is in one or other sense. In FIG. 2II, where the clock pulse waveform C is advanced with respect to the data-representing waveform D IN, it is to be noted that the clock pulse waveform C is always at the higher level whenever the changes in level occur in the data-representing waveform D IN. Where, as in FIG. 2III the clock pulse waveform C is retarded relative to the data-representing waveform D IN, the changes in level of the data-representing waveform D IN always occur when the clock pulse waveform C is at the lower level. Hence, if two successive changes in level of the data-representing waveform D IN occur at times when the clock pulse waveform is at the high level then this is an indication that the clock pulse waveform is advanced, and conversely, if such two successive changes occur at times when the clock pulse waveform is at the low level, then this is an indication that the clock pulse waveform is retarded. These conditions may be tested, in a manner to be described, in order to resynchronize the clock and data-representing waveforms. This method of resynchronization enables a slow drift out of synchronization to be corrected. However, particularly upon the initial application of a data-representing waveform to a data processing arrangement, it is possible for the waveforms D IN and C to be so completely out of synchronism that neither of the above indications can be relied upon to provide control of resynchronization. Such a condition is shown in FIG. 2IV, in which the clock pulse waveform C is 180° displaced in phase from the condition shown in FIG. 2I. Consideration of FIG. 2IV shows that in this case, too, the changes in level of the data-representing waveform D IN occur alternately while the clock pulse waveform is at high and low levels respectively. Comparison of the examples of FIG. 2I and IV, however, shows that under nominally correct conditions as shown in FIG. 2I at least one strobing signal in the waveform S occurs between any adjacent pair of changes in level in the data-representing waveform D IN; whereas in the 180° out of phase condition shown in FIG. 2IV the occurrence of an isolated single code component representation in the waveform D IN produces a condition in which two successive changes in level of the data-representing waveform D IN can occur without an intervening strobing signal in the waveform S. The particular code component representation for which this is true will, in practice, depend upon the code significance accorded to the levels of the waveform D IN and also upon the sense of bias distortion in the waveform D IN. As in the case of FIG. 2I, bias distortion in this waveform is indicated in FIG. 2IV for the two opposite senses respectively by full and dotted lines, and the conditions in which two successive data-representing waveform changes occur without the intervening occurrence of a strobing signal in the waveform S for the two bias distortion conditions are indicated respectively by references A and B. Hence, the 180° out of phase condition may be recognized by the detection of occurrences of changes in level of the data-representing waveform D IN and of strobing signals in the waveform S.

Figure 1:
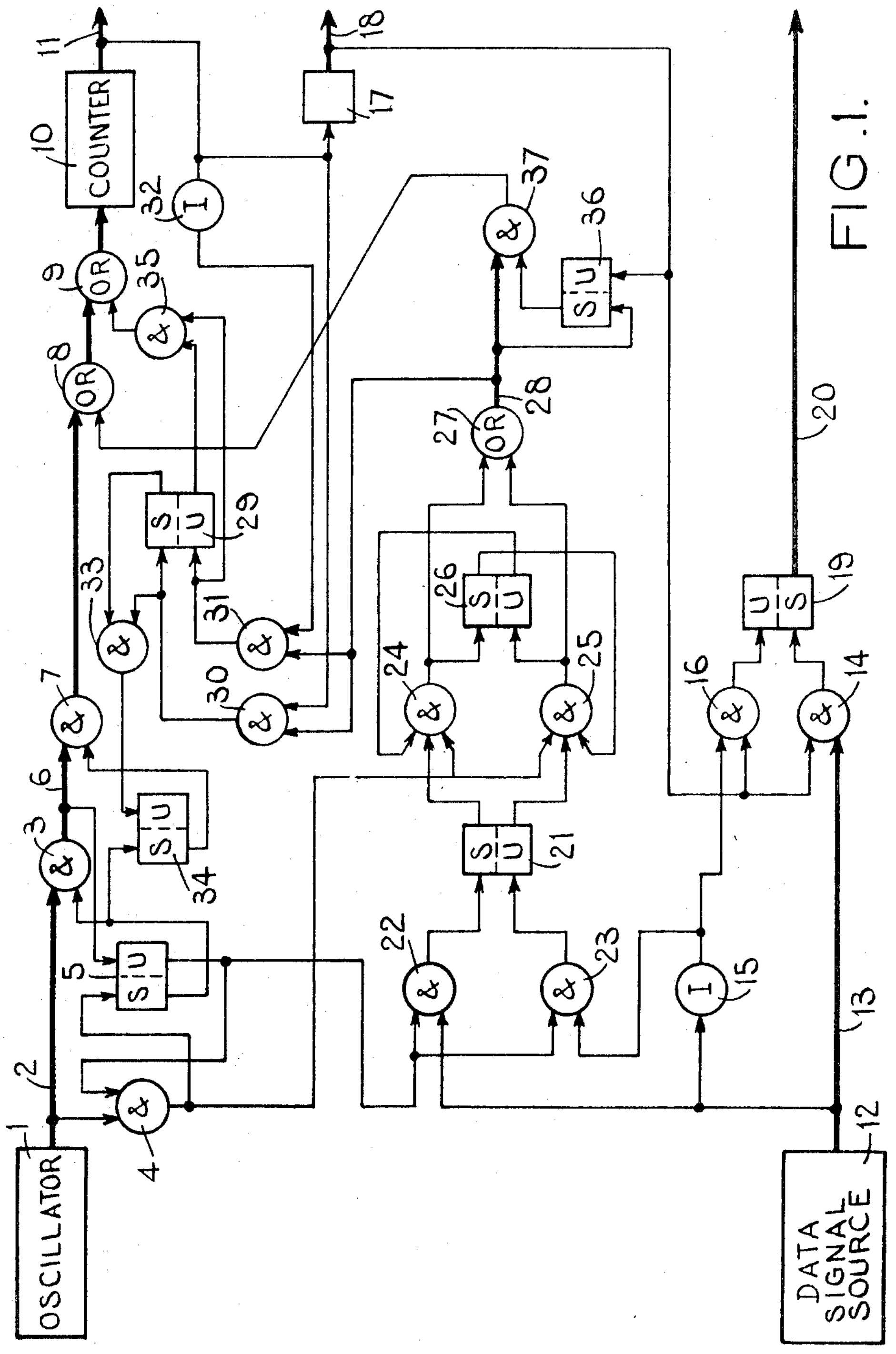
FIG. 1 is a block schematic drawing of a clock pulse synchronizing system.

The arrangement and operation of a clock pulse synchronization control system will now be described in detail with reference to FIGS. 1, 3, and 4. For the sake of clarity the detailed description will deal separately with the construction and operation of the individual circuits that make up the complete system. It is to be noted that a number of flip-flop trigger circuits are used in the circuits to be described. These triggers are of conventional form and each is settable to two states referred to respectively as set and unset states. Inputs are provided to switch the triggers to each of these states and, for example, that input which switches a trigger to the set state is referred to as the setting input. The trigger then responds to a negative-going signal applied to the input to switch to the corresponding state. The convention will be observed that pulse signals applied to these inputs are in the form of positive-going pulses so that the switching of the trigger occurs following the trailing edge of a pulse applied to the input. Set and unset outputs are provided from the triggers, and the polarity of these outputs is chosen in each case to provide the requisite signal for operating the particular element to which it is connected. In the following description the arrangement of the composite circuit elements will be described with reference to FIG. 1 and the waveforms referred to are illustrated in FIGS. 3 and 4.

Clock pulse Generation—Normal Operation

Figure 3:
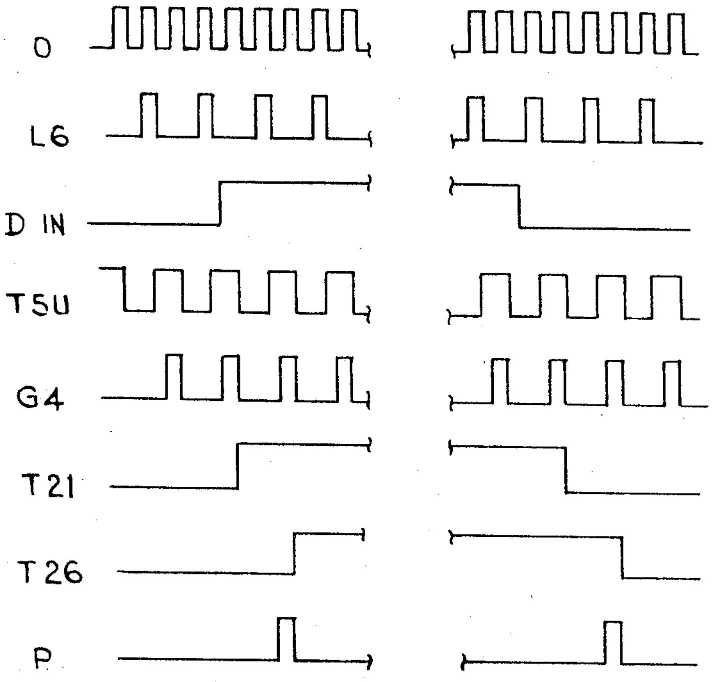
FIG. 3 is a set of waveforms showing one mode of operation of the system of FIG. 1.
Figure 4:
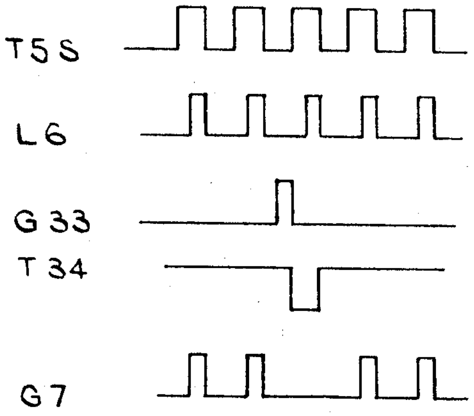
FIG. 4 is a set of waveforms showing another mode of operation of the system of FIG. 1.

Under normal operating conditions clock pulses are generated from a continuously running oscillator 1 which produces pulses at a high repetition rate on an output line 2, these pulses being illustrated at waveform 0 (FIG. 3). The line 2 is connected to inputs of a pair of AND-gates 3 and 4. A trigger 5 is connected to control the interaction of the AND-gates 3 and 4. Setting and unsetting inputs to the trigger 5 are respectively connected to the outputs of the gates 4 and 3, while the set and unset outputs of the trigger 5 are respectively connected to control inputs to the AND-gates 3 and 4. The output from the gate 3 is connected over a line 6 to a normally open AND-gate 7, and the output from the AND-gate 7 passes through an OR-gate 8 followed by an OR-gate 9 to the input of a counter chain 10. The output from the counter chain 10 is connected to a clock pulse supply line 11.

In operation alternate pulses from the oscillator 1 over line 2 are passed by the AND-gate 3 to the line 6 in the following manner. Let is be assumed that the trigger 5 is initially in the unset state. In this state the unset output from the trigger 5 conditions AND-gate 4 to open, while the absence of a set output from the trigger 5 causes the AND-gate 3 to remain closed. The next occurring pulse from the oscillator then passes through the AND-gate 4 but is prevented by AND-gate 3 from appearing on line 6. The pulse passed by AND-gate 4 is applied to the setting input of the trigger 5, and the trigger is switched by the trailing edge of this pulse to the set state. In this state the output conditions of the trigger are reversed, so that the AND-gate 4 is closed and the AND-gate 3 is opened. Thus, the second pulse on the line 2 passes through the AND-gate 3 to the line 6 and is prevented from passing the AND-gate 4. The connection from the output of AND-gate 3 to the unsetting input of trigger 5 causes the trigger to be switched once again at the end of the second pulse. The circuit is now returned to its initial condition and it will be clear that the second and alternate following, or even-numbered, pulses from the oscillator are passed to the line 6, while the intermediate, or odd-numbered, pulses are passed only by the AND-gate 4 and cannot appear on the line 6. Hence, the line 6 carries pulses at half the repetition frequency of the pulses produced by the oscillator, but the duration of these pulses on line 6 is unchanged from those on line 2. The pulses on line 6 are illustrated at waveform L6 (FIG. 3).

The counter chain 10 consists of a series of bistable triggers connected in tandem in conventional manner to form a binary counting chain, so that the output from the final stage of the chain in response to the line 6 pulses is a substantially symmetrical square waveform in which the pulses have a frequency equal to the frequency of the pulses on line 6 divided by 32. In a typical example of a clock pulse generating arrangement using this mode of generation the oscillator 1 is a crystal-controlled square wave oscillator running at 76.8 kHz. so that the pulses on line 6 occur at a frequency of 38.4 kHz. and the clock pulses on the clock pulse supply line 11 have a cyclic frequency of 1.2 kHz.

Data Input/Output Synchronization

Referring again to FIG. 1 a data signal is derived from a source 12 and is in the form of a NRZ waveform such as has been described with reference to FIG. 2 having higher and lower levels which represent data items according to binary code notation. The frequency of individual data items represented by the data signal is nominally the same as the frequency of the clock pulse cycles but the waveform has changes from one level to another only where the code significance of two successive items is different. This incoming data signal waveform, shown at D IN in FIG. 3, is applied over a line 13 directly to an AND-gate 14. An inverter element 15 is also connected to the line 13 and the inverted data signal waveform from the inverter 15 is applied to an AND-gate 16.

A one-shot multivibrator 17 having only one stable state is connected by its unsetting input to the clock pulse line 11 and the output from the multivibrator 17 then forms the strobing pulses of the strobing waveform S described above with reference to FIG. 2. This strobing waveform is applied to a strobe supply line 18, and is also connected to the control inputs of the AND-gates 14 and 16. The outputs of the gates 14 and 16 are connected respectively to the setting and unsetting inputs of a trigger 19 while the set output of the trigger 19 is connected to a main data signal output line 20.

In operation, let is be assumed that the trigger 19 is initially unset, and that the data signal waveform on line 13 is at the lower level. In this case no signal can be passed by the AND-gate 14 to set the trigger 19, and because the trigger 19 is already unset, any signals passed by the AND-gate 16 are ineffective.

If the data signal waveform now changes to the higher level the AND-gate 14 will pass a pulse on the next occurrence of a strobing pulse on line 18, the pulse from the gate 14 having a duration corresponding to that of the strobing pulse. The negative-going edge of the pulse from the gate 14 switches the trigger 19 to the set state. From this time, and while the data signal waveform remains at the higher level any further signals from AND-gate 14 will be ineffective since the trigger 19 will remain in the set state. The AND-gate 16 cannot now pass signals because the signal from the inverter 15 is always the inverse of the data signal waveform and hence is now at a low level.

If the data signal waveform then changes to its initial lower level, then once again the AND-gate 14 cannot pass signals. However, the signal from the inverter 15 will then be at a higher level, enabling the AND-gate 16 to pass a signal on the occurrence of the next following strobing pulse to unset the trigger 19. Thus, the state of the trigger 19 follows the changes in the data signal waveform from the source 12, and is set when this waveform is at the higher level, the actual switching of the trigger 19 taking place on the occurrence of the next strobing signal after a change in level of the data signal waveform. The connection of the main data signal output line 20 to the trigger 19 is such that the data signal output waveform on the line 20 follows the changes in the waveform from the data signal source 12, and the waveform on the line 20 corresponds to the waveform D OUT described with reference to FIG. 2.

Detection of Data Item Changes

A trigger 21 is provided to store an indication of the current state of the incoming data signal waveform on the line 13 from the source 12. The setting input of the trigger 21 is connected to the line 13 through an AND-gate 22, and the unsetting input of the trigger 21 is connected to the output of the inverter 15 through an AND-gate 23. The control inputs to the AND-gates 22 and 23 are both connected to the unset output of the trigger 5 described with reference to the clock pulse generation circuit. The set output from the trigger 21 is connected to an input of an AND-gate 24 and the unset output from the trigger 21 is connected to an input of an AND-gate 25. Further inputs to both AND-gates 24 and 25 are connected to the output of the AND-gate 4 of the clock pulse generation circuit. The outputs from the AND-gates 24 and 25 are connected to the unsetting and setting inputs respectively of a further trigger 26, the outputs of which are cross coupled back to the inputs of the AND-gates 24 and 25. The outputs of the AND-gates 24 and 25 are also connected through an OR-gate 27 to a main control pulse line 28 which will be referred to for clarity as the P-pulse line.

It will be seen that the trigger 21 operates in the same manner as the trigger 19 previously described in connection with data input/output synchronization, the AND-gates 22 and 23 corresponding to the AND-gates 14 and 16 respectively. The difference in the input connections of the AND-gates 22 and 23 from those of the AND-gates 14 and 16 merely results in a difference in timing of the switching of the trigger 21 as compared with the trigger 19. The timing is illustrated in FIG. 3, in which the waveform D IN shows the occurrence of changes in level of the incoming data item waveform on line 13. The signal available at the unset output of the trigger 5 is shown by waveform T5U, and this signal applied to the AND-gates 22 and 23 determines the periods during which the trigger 21 may switch. These periods always occur immediately following the passage of a pulse from the oscillator 1 through the gate 3 to the line 6, as described with reference to the clock pulse generating circuit, and the trigger 21 switches at that end of one of these periods which immediately follows a change in level in the data item waveform D IN. This timing is indicated by waveform T21 which shows the set output waveform of the trigger 21, from which it will be seen that the trigger 21 is set following a change to the higher level in the data item waveform D IN and is unset following a change to the lower level.

The trigger 26 is arranged to follow the switching of the trigger 21, but its switching is delayed slightly. For example the AND-gate 24 is conditioned by the set output of trigger 21 and is further controlled by pulses from the oscillator 1 passed by AND-gate 4. It will be recalled that the AND-gate 4 passes those pulses from the oscillator 1 which are intermediate the pulses that pass to the clock pulse generating circuit, and waveform G4 (FIG. 3) shows the timing of these pulses from the gate 4. Hence the AND-gate 24 passes a single one of these pulses following the setting of the trigger 21 to set the trigger 26. Once the trigger 26 has switched to the set state the connection from the unset output to the AND-gate 24 causes the AND-gate 24 to be closed to prevent any further pulses from being passed by this gate while the trigger 21 remains set. Unsetting of the trigger 21 causes a single pulse to pass through the AND-gate 25 to unset the trigger 26 in a similar manner. The timing of the switching of the trigger 26 is indicated by waveform T26 (FIG. 3).

Pulses passed by either of the AND-gates 24 or 25 are passed by the AND-gate 27 to the P-pulse line 28, and the waveform P of FIG. 3 shows the timing of these pulses. Thus for every change in level of the data-representing waveform D IN a single P-pulse is generated on the line 28 and the P-pulses are timed by the AND-gates 24 and 25 to occur between those pulses on line 6 which are in normal operation passed to the counter 10 as described in detail with reference to clock pulse generation.

The operation of the remainder of the circuit is concerned with correcting the three conditions of error in synchronization described in detail with reference to FIG. 2II, III, and IV. The three resynchronizing operations will, for the sake of clarity, be described separately.

Detection and Resynchronization: "Clock Advanced" Condition

A trigger 29 has its setting and unsetting inputs respectively connected to the outputs of AND-gates 30 and 31. AND-gate 30 has one control input connected directly to the clock pulse line 11, while AND-gate 31 has a corresponding control input connected to the line 11 through an inverter 32. Both AND-gates 30 and 31 have second inputs connected in common to the P-pulse line 28. The set output of the trigger 29 and the output of AND-gate 30 are respectively connected to the inputs of a further AND-gate 33 and the output of the AND-gate 33 is connected to the unsetting input of a trigger 34. The set output of the trigger 34 normally maintains open the AND-gate 7 of the pulse supply line to the counter 10 in the clock pulse generating circuit, and the setting input of the trigger 34 is connected to the set output of the trigger 5.

In operation the trigger 29 provides an indication of the state of the clock pulse waveform at each change of level in the incoming data signal. It will be recalled that a P-pulse is generated for each such change. One or other of the AND-gates 30 and 31 is respectively conditioned to pass a P-pulse in dependence upon whether the clock pulse waveform is high or low at the time when the P-pulse occurs. The AND-gate 30 passes the pulse if the clock pulse waveform is at the higher level at this time, and the AND-gate 31, because it is conditioned by an inverted clock pulse waveform, passes the pulse if at this time the clock pulse waveform is at the lower level. Thus, assuming that the trigger 29 is unset and that the P-pulse is passed by the AND-gate 30, then at the end of the pulse the trigger 29 is set to indicate that the clock pulse waveform was at the higher level. If at the next data change the clock pulse waveform is at the lower level, the AND-gate 31 passes the P-pulse and at the end of the pulse the trigger 29 is unset.

Hence, if two succeeding P-pulses are passed by the gate 30, indicating that on two consecutive changes in data waveform level the clock pulse waveform was at the higher level, then the second of these P-pulses is also passed by the AND-gate 33. This is because the set output of the trigger 29 is already conditioning the AND-gate 33 at the time when the second P-pulse is passed by the AND-gate 30. This condition is indicative, as described with reference to FIG. 2H, of the "clock advanced" condition, and the timing of the P-pulse passed by the AND-gate 33 is indicated in FIG. 4 by waveform G33.

The end of the P-pulse passed by the AND-gate 33 causes the trigger 34 to be unset, as indicated at waveform T34 in FIG. 4, and the set output of this trigger 34 which normally maintains AND-gate 7 open then causes the gate 7 to close, with the result that the next occurring pulse on line 6 does not pass through the gate. The timing of the pulses on line 6 and at the output of the gate 7 are indicated in FIG. 4 by waveforms L6 and G7 respectively. At the same time the pulse on line 6 which was inhibited from passing the AND-gate 7 is applied in the normal way to unset the trigger 5. The failure of the set output of the trigger 5 as it switches produces a negative-going signal as indicated in waveform T55 of FIG. 4, and the connection of the set output of the trigger 5 to the setting input of the trigger 34 causes the trigger 34 to be restored to its normal set condition to allow subsequent pulses from line 6 to pass the AND-gate 7.

Thus, in response to the recognition of a "clock advanced" condition the circuit described suppresses the passage of one signal from the line 6 to the clock pulse counting chain 10, and this results in the counting chain taking slightly longer than normal to reach its full count, with the result that the clock pulse waveform is slightly delayed.

Detection and Resynchronization: "Clock Retarded" Condition

A further AND-gate 35 is provided and the inputs of this gate 35 are connected respectively to the output of AND-gate 31 and the unset output of the trigger 29. The output from the AND-gate 35 is connected to the OR-gate 9.

The operation of the AND-gate 31 and the trigger 29 is described in relation to detection of the "clock advanced" condition, and it will be recalled that the AND-gate 31 passes a P-pulse whenever a change in level of the data-representing waveform occurs at a time when the clock pulse waveform is at the low level and that a P-pulse passed by the AND-gate 31 is applied to the unsetting input of the trigger 29.

Thus, if two consecutive changes in level of the data-representing waveform occur when the clock pulse waveform is at the lower level (an indication that the "clock retarded" condition exists, as described earlier) then at the end of the first of the P-pulses from gate 31 the trigger 29 is unset, conditioning the AND-gate 35, and the second of these P-pulses then passes through the AND-gate 35 to the OR-gate 9. It will be recalled that P-pulses always occur in between pulses on the line 6, so that the effect of applying a P-pulse through the OR-gate 9 to the clock pulse counter chain 10 is to reduce slightly the time taken for one clock pulse cycle and thus to advance the clock pulse waveform.

Detection and Resynchronization: "180° Out-of-Phase" Condition

A trigger 36 is provided of which the setting input is connected to the P-pulse line 28 and the unsetting input is connected to the strobe supply line 18. The set output of the trigger 36 is connected to a control input of an AND-gate 37. The P-pulse line 28 is also connected to an input of the AND-gate 37. The output of the AND-gate 37 is connected to an input of the OR-gate 8 in the pulse supply line to the clock pulse counterchain 10.

In operation, the trigger 36 is set by a P-pulse for every change in level of the incoming data-representing waveform from the source 12. The strobing signals from the line 18 unset the trigger 36. It will be recalled that the "180° out-of-phase" condition is identifiable if two successive changes in level of the data-representing waveform occur without the intervention of a strobing signal. Thus the trigger 36 is set at the end of a first P-pulse, and if no strobing signal has reset the trigger 36 by the time a second P-Pulse occurs, then this second P-pulse passes through the AND-gate 37 which is held open at this time by the set output from the trigger 36. The P-pulse passed by the AND-gate 37 passes through the OR-gate 9 to the pulse supply line to the counting chain 10. Since P-pulses are timed to occur between the pulses which normally occur at the input of the counting chain 10, the effect of the application of a P-pulse on this input is to slightly reduce the time taken for one clock pulse cycle and thus to advance the clock pulse waveform. The application of P-pulses to the counting chain continues for as long as the "180° out-of-phase" condition is detected. When the clock pulse waveform has been sufficiently advanced so that this condition is no longer detected it will be realized that at this time the "clock retarded" condition will occur, and the application of P-pulses to the counting chain will then continue as described in connection with the description of resynchronization under this condition.

It will be realized that the shortening or lengthening of a single clock pulse cycle as described in the foregoing paragraphs may not be sufficient to completely resynchronize the clock and data-representing waveforms. It is to be understood, however, that if resynchronization is not completed on one cycle an error condition will continue to be detected and the process of resynchronization is continued until the absence of error condition indications show that it is completed. The degree of correction resulting from the omission of a single input pulse to the counting chain 10 or from the application of one extra input pulse thereto is clearly quite small, and in the case described in which the counting chain effectively divides the normal repetition rate of the applied signals by 32, is equal to approximately one thirty-second part of the duration of a clock pulse cycle. A greater degree of adjustment is possible by making the counting chain shorter and using a slower frequency oscillator as the source from which clock pulses are derived. However, although for this reason a low-frequency pulse source is desirable, yet a high-frequency source is desirable to provide accurate locking of the clock pulse waveform to the data representation waveform under conditions of severe random distortion of the data waveform, such as may be experienced, for example, when the data waveform is transmitted from a remote station. Hence, the frequency of the oscillator 1 is preferably chosen as a compromise between these two conflicting requirements according to the particular environment in which the synchronizing system is to be installed.

It will also be appreciated that correction of the clock pulse waveform, particularly in the case of the "180° out-of-phase" condition may be more rapidly secured by modifying the correction control arrangement to permit more than one pulse to be added to or inhibited from the counter chain 10 input on the detection of an error. In this case, however, it is to be borne in mind that under certain conditions, particularly in the presence of impulse noise, the reliability of the system may be decreased.

I claim:

1. A clock-synchronizing circuit including a source of first pulses at a substantially constant repetition frequency; a countdown circuit; a first gating circuit connected between said source of first pulses and said countdown circuit, the countdown circuit being operable to produce timing signals in response to successively applied predetermined numbers of pulses with the timing signals occurring at time intervals of predetermined duration; said first gating circuit arranged to pass only alternate ones of said first pulses from said source of first pulses to said countdown circuit; a data signal source producing a signal having significant transitions each representing a change in data significance; marking pulse-generating means responsive to said data signal to generate a marking pulse for each change in data significance, the marking pulses being timed to occur between said alternate ones of said first pulses and a second gating circuit responsive to said marking pulses and to said timing signals and operable in response to the occurrence of a first pair of successive marking signals within one of said timing intervals to apply the second marking pulse of said first pair to said countdown circuit to shorten a following one of said time intervals.

2. A system as claimed in claim 1 in which said data signal source produces a data signal having two levels representing respectively data items of opposite binary significance, the data signal changing from one to the other level only if the binary significance of a data item differs from that of the immediately preceding item.

3. A system as claimed in claim 1 in which said marking generator means includes a device switchable between two stable states, said device being responsive to changes in data signal levels to switch from one state to the other.

4. A system as claimed in claim 3 in which said marking pulse generator also includes a third gating circuit having first and second AND gates, each of which is responsive to said device in one stable state, respectively, with each AND gate also being responsive to those of said first pulses not passed by said first gating circuit such that said third gating circuit passes one of those first pulses for every change of level of said data signal.

5. A system as claimed in claim 1 including means responsive to the output of said countdown circuit to produce an indicating pulse once during each of said timing intervals, said second gating circuit including a bistable element which may be conditioned in a first or second stable state, the first input of the bistable element being responsive to the output of said marking pulse generator with the second input thereto being responsive to said indicating pulse, and a third AND gate one input of which is responsive to the output of the marking pulse generator and the other input being responsive to said bistable element conditioned in a first state such that upon a pair of marking pulses being produced between two indicating signals, the second marking pulse of said pair is passed by said third AND gate to said countdown circuit.

6. A system as claimed in claim 1 in which the countdown circuit includes a binary counting chain having a plurality of cascaded binary stages to produce a clock pulse train consisting of a substantially symmetrical square waveform having two levels in response to the application to the countdown circuit of a series of regularly occurring pulses; and means for deriving said timing signals from the clock pulse train.